J. Amory,

Steam-Boiler Furnace.

No. 2,057. Reissued Aug. 29, 1865.

Witnesses
Joseph Gavan
Lewis H. Pope

Inventor
Jonathan Amory

UNITED STATES PATENT OFFICE.

JONATHAN AMORY, OF WEST ROXBURY, MASSACHUSETTS.

IMPROVEMENT IN STEAM-BOILER FURNACES.

Specification forming part of Letters Patent No. 23,650, dated April 19, 1859; Reissue No. 2,057, dated August 29, 1865.

*To all whom it may concern:*

Be it known that I, JONATHAN AMORY, of West Roxbury, in the county of Norfolk and State of Massachusetts, have invented certain new and useful Improvements in the Construction of Furnaces for Steam-Boilers and other Similar Purposes; and I do hereby declare that the following is a full, clear, and exact description of the construction and operation thereof, taken in connection with the accompanying drawings, making a part of this specification, in which—

Figure 1:
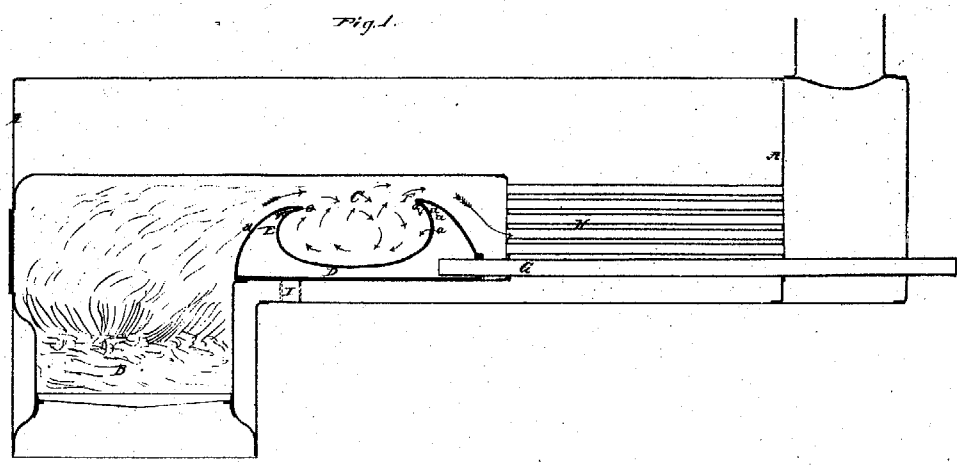
Figure 2:
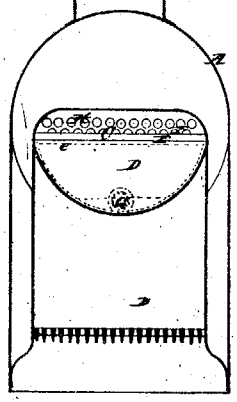

Figure 1 is a longitudinal sectional elevation of a locomotive-boiler with the improvements applied thereto; Fig. 2, a transverse section through the fire-box, showing the fire curves in elevation.

The letters of reference indicate like parts in all the figures.

My invention consists in certain modifications of what is known as Baker's furnace, for which Letters Patent were granted to Henry F. Baker, May 30, 1846, by means of which the combustion of the fuel therein is better effected, and the invention is better adapted to be used in locomotives and for other boilers having internal fire-places, and to other similar conditions of use.

The first part of my invention relates to the manner of constructing the "curves," so called, which inclose the combustion-chambers, and consists in constructing that part of the curves toward the fire-place by continuing the curve upward and forward so as to make the curve terminate in a thin overhanging projection, which, in connection with the other parts of the curve, serves to insure a more perfect rotation or eddying of the gases from the fire-place in said chamber, so that in connection with the orifices for the admission of air in said curves a more intimate mixing of the air with the gases is effected, and being thus mixed they are so presented to the incoming current of flame as to insure their complete combustion.

The second part of my invention relates to the constructing of the curves of metal and the employment of them for heating the air to be thrown into the combustion-chamber, as before explained.

In the construction of the curves of locomotive-boilers, as shown in the drawings, they must necessarily be made of metal, both from the less space occupied than would be if bricks were used, for security against being destroyed by the jostling of the locomotive in running over the inequalities of the road, and also for the reason that they can be more conveniently connected with the boiler. But unless the metal curves were in some way protected from the fierce heat of the flame from the fire-place, or more especially on that side next to the fire-place, they would be destroyed in a few hours. To prevent this result, and at the same time to heat the air to be thrown into the combustion-chamber, I make the space or chamber behind the curves the heater, and by so bringing in the current of air as to throw the current against the most heated side of the chamber, which, by rapidly absorbing the heat, keeps the metal so cool as to preserve it while the air is heated to a degree proper to be injected into the combustion-chamber and then combined with the unconsumed gases.

The drawings represents a locomotive-boiler as disconnected from all accessory parts.

A is the boiler; B, the fire-chamber; C, the combustion-chamber, and D the metallic curves, which inclose the combustion-chamber, as shown, and also serve as a heating-chamber for the air before it passes into the combustion chamber. The more remote extremity of the curve F is formed much like the corresponding part of the curves, described in Baker's patent, before mentioned, excepting as to the admission of the air, which is here admitted through the holes *a a a*, as shown; but at the opposite extremity, E, it is made with an internal curve, *d*, uniting with the internal curve in a horizontal position, forming an overhanging projection, as shown in the drawings at *e*, over which, externally, the products of combustion from the fire-place are guided, so as to insure the formation of an eddy or vortex within the combustion-chamber, for the purpose to be hereinafter described.

Between the interior and exterior curves at *e* is a long narrow aperture, extending the whole breadth of the curves, through which the air passes into the combustion-chamber. This serves both to protect the thin extremities of the curves from the intense heat of the flame as it comes from the fire-chamber, and distributes the air evenly to the volume of gases passing over it. The air is supplied to the outer part of the volume through the holes *a a*, &c., in the other extremity of the curve, which also protects that part of the curve from the extreme heat. In the curves of the Baker furnace, before mentioned, they are shown in the patent of such form as to cause the rotation of the eddies formed in the chambers to be in a backward direction or with the returning stratum uppermost; but it is found by experiment that the natural tendency of the eddy is to revolve in the opposite direction. My improvement in the form of the curve is designed to carry out that principle and insure the more perfect formation of the eddy, by the action of which the intimate mixture of the air with the gases is effected to adapt them to complete combustion. The air is admitted into the heating-chamber through the pipe G, extending forward of the boiler, being forced in by the draft, and also by the progressive movement of the engine; but it may be admitted at any other part, as at I, provided the currents are thrown upon the more heated parts to protect them.

H is the tubes, constructed in the usual way, except that they are shorter and extend only to the recess in which the curves are placed, which occupies the space usually occupied by the tubes.

The operation of the improvements are believed to be sufficiently obvious from the drawings and description, and may be considerably modified in form without changing the principles.

The two things intended to be accomplished by the improvements are, first, to give such a direction to the current passing through the furnace as shall insure the formation of a strong eddy as the means by which the air is mechanically mixed with the gases, and, second, to be able to use metal curves by protecting them by the current of cool air, substantially as described.

What I claim as my invention, and desire to secure by Letters Patent, is—

The method of increasing the combustion and protecting the combustion-curves, substantially as described.

In testimony whereof I have signed my name to this specification before two subscribing witnesses.

JONATHAN AMORY.

Witnesses:
JOSEPH GAVETT,
A. POLLOK.